United States Patent [19]
Baumann

[11] 3,805,839
[45] Apr. 23, 1974

[54] VALVE APPARATUS WITH DOUBLE, RIGID AND RESILIENT METAL SEAT

[75] Inventor: Hans D. Baumann, Foxboro, Mass.

[73] Assignee: Masoneilan International, Inc., Norwood, Mass.

[22] Filed: Mar. 6, 1972

[21] Appl. No.: 232,048

[52] U.S. Cl............................ 137/625.35, 251/282
[51] Int. Cl................................................ F16k 11/07
[58] Field of Search........ 277/206 K, 180, 236, 185; 251/175, 176, 186, 208, 282, 332, 334; 285/112; 137/625.33, 625.34, 625.35, 625.36, 625.37, 454.6

[56] References Cited
UNITED STATES PATENTS

| 3,654,950 | 4/1972 | Hamm ............................ 285/112 X |
| 3,439,701 | 4/1969 | Stella ............................ 137/454.6 X |

FOREIGN PATENTS OR APPLICATIONS

| 9,020 | 4/1899 | Great Britain ...................... 251/334 |
| 926,789 | 5/1963 | Great Britain ...................... 277/180 |
| 609,513 | 2/1935 | Germany ........................ 137/625.35 |

Primary Examiner—Henry T. Klinksiek

[57] ABSTRACT

Valve apparatus providing tight shutoff in applications, such as double port valves and single port valves with pressure balanced plugs, that require two seating surfaces, and being characterized by, in combination with a first, fixed, rigid metal valve seat, a second, self-energizing, adjustmentless resilient metal valve seat.

9 Claims, 3 Drawing Figures

VALVE APPARATUS WITH DOUBLE, RIGID AND RESILIENT METAL SEAT

BACKGROUND OF THE INVENTION

For minimum leakage with the valve closed, a two seated valve must have proper spacing between the seating surfaces. Thus, in applications involving double seats, it has heretofore been necessary to provide a second seat which is axially adjustable, relative to the first seat; and it has also been required to regularly adjust the second seat, to achieve wanted leakage rates approximating or at least approaching those attainable with single seated valves.

The problem, of meeting these requirements, has, of course, been confronted before. Thus Luthe U.S. Pat. No. 3,572,382, for example, proposes for the axial adjusting a ring 64 (and 164) of elastomeric material, and which is made into a second seat by the device of providing it with a lip 68 (and 168) extending radially inward of the outside diameter of the valve plug 30 into an undercut provided therefor over an intermediate length of the plug periphery.

Constructions such as Luthe's are found, however, to introduce new problems. First, the necessity of resorting to rubber or rubber compound materials for the second seat thereof renders the prior art double seated valve mechanism severely limited in its range of application; specifically, the composition materials are severaly limited in their permissible temperature exposure, and serve to preclude the use of valves employing them in many of the applications for which in this invention is intended, including, among such precluded uses, use with commonly controlled fluids such as steam.

Second, the valve plug undercutting arrangement of the sealing lip of the elastomeric, prior art second seat requires that said lip be bent back through elastic deformation, to clear the plug, every time that is inserted into or removed from the bore of the valve cage. It will be appreciated, therefore, that the Luthe seal could not be substituted for a seal made from a temperature metal, as to which the described undercut construction and plug clearing deformation is, of course, precluded.

Third, the necessity of introducing the aforementioned undercut in or reduced diameter section of the valve plug is found to provide a cavity that is capable of being plugged up with solids or impurities, and that can severly hamper accurate regulation of positioning of the valve plug, and more generally prevent wanted fine adjustment of the valve position with the application of limited actuator force.

This invention avoids and overcomes the foregoing difficulties and disadvantages.

BRIEF SUMMARY OF THE INVENTION

Valve apparatus of the class having two seating surfaces, including double port valves and single port valves with pressure balanced plugs, wherein is provided a novel second seat construction imparting to the double seat apparatus the characteristics of, or fitting such valve apparatus for applications requiring, tight shutoff, or leakage rates similar to those attainable with single seated valves. In a disclosed embodiment, first and second or double seat valve apparatus having as the second a resilient metal valve seat.

The invention more generally provides, in the preferred embodiment hereof, a double, fixed and resilient seat valve having tight shutoff, quick change trim. The valve apparatus hereof is novelly characterized also by a dynamic or self-generating action, or more of operation, wherein the upstream fluid pressure is employed to reinforce the valve sealing by the second, resilient metal seat.

DETAILED DESCRIPTION OF THE INVENTION

Figure 1:
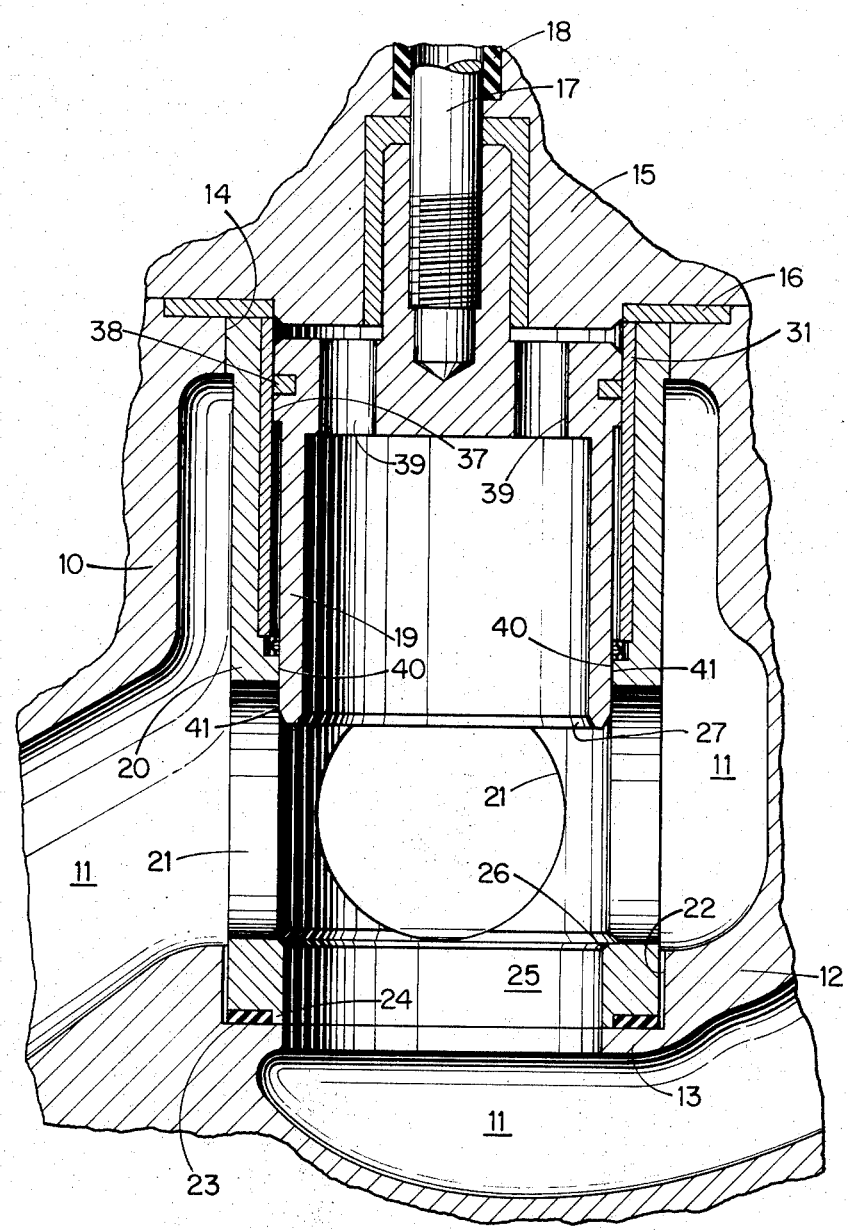
FIG. 1 is a vertical section of a valve apparatus embodying the invention.

The two or rigid and resilient metal valve seat apparatus of the invention is shown in FIG. 1 as incorporated in a single ported, balanced plug, quick change trim valve comprising a valve body or housing 10 apertured by a through passage 11 for flowing therethrough a fluid inletting and outletting at body 10 ends which, as well understood in the art, may be flanged or otherwise fitted to comprise, or be comprised in, a fluid flow line.

Intermediate the fluid passage 11 the body 10 is formed interiorly with a transverse partition 12 constricting passage 11 thereat to an annular opening or port therethrough as defined by the herein lateral lip or ledge 13.

Opposite transverse partition 12 the body 10 has an upper wall aperture 14 coaxial with the transverse partition 12 port or opening defined by the lip or ledge 13.

The upper wall aperture 14 is closed by a usual bonnet 15 clamped as conventionally to the body 10 and sealed thereto by a sealing and elastic hold down gasket 16 recessed in body 10 about the aperture 14, and overlying the cylindrical parts to be described.

A valve stem 17 is sealed through bonnet 15 as by usual packing 18, and has threaded or otherwise mounted thereon a plug 19 whereby, upon reciprocating of the stem 17, as by any external actuator means, the plug 19 is urged or carried towards and away from the invention seat means.

A cylindrical cage 20 having a balanced plurality of annular or other openings 21 therethrough for the fluid flow, and which is received through upper body wall aperture 14 and engaged between bonnet 15 and partition ledge 13, is received within partition recess 22, and is sealed thereat by a gasket 23 which is retained by a cage inner lip or flange 24 extending downwardly inside the gasket 23 to abut the lip 13.

Cage 20 is defined as the first, fixed, rigid metal valve seat means hereof by a bottom reduced inside diameter portion 25 which is upwardly shouldered or chamfered to form the inclined or tapered valve seat 26.

To engage seat 26, upon the full seating of the plug 19, a matingly tapered, plug seating face 27 is provided thereon.

cage 20 has counterbore 28 defining an internal shoulder 28a located above the openings 21, and above said shoulder 28a is further recessed at 29 to define a second step or shoulder 29a.

A second, movable or deflecting resilient metal valve seat means 30 is received on cage shoulder 28a, and is held thereon by a sleeve 31 which is received in cage 20, is seated on shoulder 29a, and overlies partially valve seat 30.

Cage 20 and sleeve 31 are elastically held down respectively against ledge 13 and shoulder 29a by overlying gasket 16, as compressed under bonnet 15.

Figure 2:
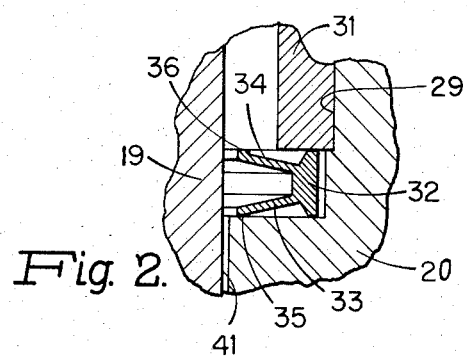
FIG. 2 is a fragmentary section on a larger scale detailing the resilient metal valve seat and showing that in open position.
Figure 3:
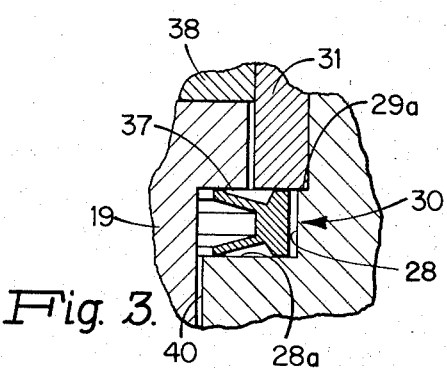
FIG. 3 is a view like that of FIG. 2 but showing the resilient metal valve seat in closed position.

The second, deflecting, resilient metal valve seat hereof comprises in the preferred embodiment a K seal, or metal ring having a solid or rigid outer body portion 32 axially engaged between shoulder 28 and sleeve 31, and which is smaller than or peripherally spaced within the cage 20 counterbore 28 thereat, as shown, FIGS. 2 and 3.

The resilient metal second seat hereof further comprises flexible or resilient disc means extending inwardly of said metal ring rigid outer body portion, and more particularly a pair of legs or discs 33, 34 extending laterally inward from intermediate, wall thickening root junctures with, and being spaced axially of, the outer ring body portion 32. Lower disc 33 diverges downwardly from its said intermediate juncture to engage cage shoulder 28a, at downfacing, flat faced foot or flange 35 metal-to-metal sealing therewith, and may normally extend below outer annulus 32, so as to be spring tensioned in its described seating on said shoulder 28a on which is rested also said ring outer annulus 32.

Upper disc 34 diverges oppositely or upward, and terminates in upfacing flat faced foot or flange 36 extending inwardly of sleeve 31, but short of engagement with the plug 19 main body portion, the straight, smooth outside dimensioning or diameter of which is predeterminedly smaller than or spaced inwardly of cage 20, FIGS. 2 and 3, to admit the upstream fluid, or the fluid passing cage opening 21, to the region of the resilient metal seal or seat 30.

The legs 33, 34 are mainly or partly of a width or cross section to give or bend, spring-like, under the axial deflecting forces to which they are subjected by, and to the extent occasioned by, the closing of the valve plug 19.

Means are associated with said valve plug 19 for engaging that to said second, deflecting or resilient metal seat 30 upon the aforementioned shifting of plug 19 toward the first, fixed or rigid metal seat 26, and herein comprising annular enlargement or shoulder 37 extending externally or outwardly of the main body of plug 19 to overlie disc 34, or its foot 36, and thereby overlying also internal cage shoulder 28 a and telescoping within sleeve 31 from the open position of FIGS. 1 and 2 to the closed position of FIG. 3. Plug 19 is sealed to said sleeve 31 by gasket 38 recessed in shoulder 37, whereby the apparatus is made a balanced valve by plug end wall openings 39 admitting the fluid pressure to the region above or behind said gasket 38 as shown, FIG. 1.

The axial spacing of the parts is predeterminedly such that when plug 19 is closed towards seat ring 20, by axially downward shifting of stem 17 through the aforesaid external actuator means, the initial engagement of said shoulder 37 against the second, deflecting or resilient metal valve seat 30, and more particularly against flange 36 of disc 34, occurs just prior to the engagement of plug seating face 27 against the first, fixed, rigid metal valve seat 26. At the described initial engaging of the valve plug associated means to the second, resilient metal seat means, FIG. 3, the clearance or spacing remaining between the first seat engaging faces 26, 27 will calculatedly be a distance exceeding manufacturing tolerances.

Thus, the further shifting of plug 19 to bring the first seat faces 26, 27 into tight sealing engagement occasions, and is enabled by, the upper disc 34 deflecting or yielding downwardly under the plug closing pressure. The slight further advance of the plug shoulder 37 from the initial disc 34 engaging to the final, first seat sealing position will be understood to set up a return pressure, in the thus stressed or biased disc 34, which is sufficient to seat or seal its foot 36 tightly against plug enlargement or shoulder 37.

In the closing of plug 19 its smaller or main body portion will be seen to engage the first seat 26 while clearing ring 30 and also the cage 20 main body portion because it is at cage bottom reduced diameter portion 25 that is located seat face 26 which underlies plug seating face 27.

The spacing which is provided between the face 40 of the cage 20 portion between reduction 25 and enlargement 28 and the opposing face 41 of the smaller, main body portion of plug 19, and which is exaggeratedly shown in FIGS. 2 and 3, will be seen to qualify the second, resilient metal seat 30 hereof as a dynamic seal. More particularly, the described admitting of the upstream line fluid pressure between said faces 40, 41 to the region of K seal 30 renders that self-energizing, in that the fluid pressure acts or urges between the seal legs 33, 34 in such a manner as to reinforce the described spring biased sealing engagement thereof with cage shoulder 28a and plug shoulder 37, respectively.

The resilient metal second seat hereof, in standard metal construction or materials, is effective over a wide range of pressures, temperatures and line fluids. With the indicated elimination of the need for adjustment of distances between the seats, leakage rates similar to or approximating those with single seated valves are hereby made possible, then, over such range.

And since the second seat ring hereof is in contact with the valve moving parts only when the valve plug is in the closed position, the seat ring does not add friction to the normal valve operation, as would be experienced with a sliding seal. Thus, installation and replacement of the parts is easily accomplished with this invention, as the sealing action of the second seat ring is attainable without the requirement of a sealing interface at, or in other words, with provision as herein shown of manipulation-easing clearance about, the outer periphery of the seat ring.

Also, as above shown, the prior necessity of bending back the resilient seal to clear the valve plug, and of indenting the main plug body portion with an impurity accumulating, adjustment impairing cavity, has been avoided, with the improved, two seated valve construction of the invention.

I claim:

1. Double, rigid and resilient metal seat valve apparatus comprising, in combination:

a valve body having a through passage for fluid flow;

means within said body forming a constricted port intermediate in said passage;

annular cage means fixed in said passage and sealed to said valve body above said port;

means associated with said cage means providing an annular, tapered, rigid metal valve seat at said port;

an annular, resilient metal valve seat received and supported in said cage means above said rigid metal valve seat;

annular valve plug means received within said annular cage means and extending within said resilient metal valve seat and shiftable axially toward and away from said rigid metal valve seat to close and open said port;

a tapered seating face on said annular valve plug means mating with said tapered rigid metal cage means seat, upon the shifting of said annular valve plug means to close said port;

fluid flow openings through said annular cage means, said openings passing said fluid flow through said constricted port upon the shifting of said annular valve plug means to open said port;

a main body portion provided on said valve plug means, said main valve plug body portion clearing said resilient metal valve seat and smaller also than said annular cage means; and an annular enlargement provided on said valve plug means, said annular valve plug enlargement extending outwardly of said main plug body portion and to overlie said resilient metal valve seat, and axially spaced so as to engage said resilient metal valve seat upon said axially toward shifting of said annular valve plug means before that has closed said constricted port, and whereby said resilient metal valve seat is deflected by said enlargement upon and thereby permits the further axially toward shifting of said valve plug means to close said constricted port by the engagement also of its said tapered seating face against said rigid metal valve seat;

said annular valve plug means sealing between said constricted port and said valve body above said port, and thereby effecting tight shut off of said fluid flow through said passage, upon its said shifting to engage against both said rigid and resilient metal valve seats; and the spacing between the opposing faces of said fixed annular cage means and said smaller main body portion of said shiftable annular plug means admitting fluid flowing in said passage to pass between said faces to the region of said resilient metal valve seat and there to act thereon in such manner as to reinforce the opposition of said resilient metal valve seat to said axial engagement and deflecting thereof by said outwardly projecting plug enlargement in said further axially toward valve plug means shifting, whereby to assure to said resilient metal valve seat the properties of a metallic seal.

2. The valve apparatus of claim 1, wherein said resilient metal valve seat comprises a metal ring having a rigid outer body portion, and flexible disc means mounted axially intermediate and extending inwardly of said outer body portion, and deflected by said outwardly extending valve plug means enlargement.

3. The valve apparatus of claim 2, wherein said cage means comprises an internal shoulder seating said outer metal ring body portion of said resilient metal valve seat, and wherein said flexible disc means comprise a disc diverging from said mounting axially intermediate said outer body portion to engage said internal cage shoulder, and a disc diverging oppositely therefrom towards said radially projecting resilient metal valve seat engaging plug means portion.

4. The valve apparatus of claim 2, wherein said cage means seats said ring outer body portion, and wherein said inwardly extending flexible disc means closes between said cage and plug means upon its said axial engagement by said radially projecting plug portion, whereby the manner of acting thereon, of said fluid admitted from said passage between said cage and plug means to the region of said ring is to reinforce the pressure of said disc means against said plug portion upon said shifting of said plug to deflect said disc means.

5. The valve apparatus of claim 4, wherein said inwardly projecting, cage-plug closing flexible disc means comprise an inner terminal portion projecting axially of said flexible disc means and formed with a sealing surface conformed to and establishing area contact with said plug means shoulder.

6. The valve apparatus of claim 1, wherein said outwardly extending valve plug means enlargement is an external shoulder, and wherein said cage means has an internal shoulder on which is supported said resilient metal valve seat and which radially overlaps said external plug means shoulder, and wherein said resilient metal valve seat comprises a metal ring seated on said internal cage means shoulder and having a resilient portion axially spaced from said internal cage means shoulder towards said external plug means shoulder.

7. The valve apparatus of claim 6, and a sleeve received in said cage means and seated on said rigid outer ring portion, and having a snug, sliding and sealing fit with said outwardly projecting, resilient-seat-engaging portion of said plug means.

8. The valve apparatus of claim 1, wherein said valve plug means has an end wall, and openings through said end wall admitting fluid pressure to the region above and thereby balancing said pressure across, said valve plug means.

9. The valve apparatus of claim 1, wherein said rigid metal valve seat is formed on said annular cage means.

* * * * *

UNITED STATES PATENT OFFICE
CERTIFICATE OF CORRECTION

Patent No. 3,805,839                         Dated April 23, 1974

Inventor(s)    Hans D. Baumann

It is certified that error appears in the above-identified patent and that said Letters Patent are hereby corrected as shown below:

In the background of the invention, Col. 1, line 33, "in," second occurrence, should be deleted; Col. 1, line 42-43, "temperature metal" should read -- temperature resistant metal --  Col. 1, line 50, "regulation of" should read -- regulation or --  Col. 2, line 5 "more" should read -- mode --  Col. 2, line 67 "cage" should read -- Cage --.

Signed and sealed this 15th day of July 1975.

(SEAL)
Attest:

RUTH C. MASON
Attesting Officer

C. MARSHALL DANN
Commissioner of Patents
and Trademarks